(12) United States Patent
Hoshi et al.

(10) Patent No.: US 11,851,045 B2
(45) Date of Patent: Dec. 26, 2023

(54) SERIES HYBRID VEHICLE CONTROL METHOD AND SERIES HYBRID VEHICLE CONTROL DEVICE

(71) Applicant: Nissan Motor Co., Ltd., Yokohama (JP)

(72) Inventors: Kiyoshi Hoshi, Kanagawa (JP); Hiroko Katayama, Kanagawa (JP); Azusa Kobayashi, Kanagawa (JP); Hiroyasu Fujita, Kanagawa (JP); Hiromu Morishita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/040,303

(22) PCT Filed: Aug. 5, 2020

(86) PCT No.: PCT/JP2020/030048
§ 371 (c)(1),
(2) Date: Feb. 2, 2023

(87) PCT Pub. No.: WO2022/029937
PCT Pub. Date: Feb. 10, 2022

(65) Prior Publication Data
US 2023/0303059 A1    Sep. 28, 2023

(51) Int. Cl.
*B60W 20/13*        (2016.01)
*B60W 10/06*        (2006.01)
(Continued)

(52) U.S. Cl.
CPC ............ *B60W 20/13* (2016.01); *B60W 10/06* (2013.01); *B60W 10/08* (2013.01); *B60K 6/46* (2013.01);
(Continued)

(58) Field of Classification Search
None
See application file for complete search history.

(56) References Cited

U.S. PATENT DOCUMENTS

| 9,566,976 B2 | 2/2017 | Fujishiro et al. |
| 2011/0137502 A1 | 6/2011 | Kato et al. |

(Continued)

FOREIGN PATENT DOCUMENTS

| CN | 101941375 A | 1/2011 |
| CN | 105383311 A | 3/2016 |

(Continued)

*Primary Examiner* — Todd Melton
*Assistant Examiner* — Jason R Roberson
(74) *Attorney, Agent, or Firm* — Global IP Counselors, LLP

(57) ABSTRACT

A series hybrid vehicle control method for controlling a vehicle that has a battery, an electric power generating motor, a drive motor and an internal combustion engine. The battery charged with the electric power from the electric power generating motor that generates electric power by being driven by the internal combustion engine, and charged with the electric power regenerated by regenerative braking of the drive motor. The drive motor drives a drive wheel. The electric power consumption for motoring is greater in a B range than in a D range. The control method sets deceleration caused by regenerative braking of the drive motor to be greater in the B range than in the D range, and starts motoring of the internal combustion engine in the B range at a lower SOC of the battery than the SOC of the battery in the D range.

6 Claims, 11 Drawing Sheets

(51) Int. Cl.
   *B60W 10/08* (2006.01)
   *B60K 6/46* (2007.10)
   *B60L 7/10* (2006.01)

(52) U.S. Cl.
   CPC .......... *B60L 7/10* (2013.01); *B60W 2510/244* (2013.01); *B60W 2540/215* (2020.02); *B60W 2710/0644* (2013.01); *B60Y 2200/92* (2013.01)

(56) References Cited

U.S. PATENT DOCUMENTS

| | | | | |
|---|---|---|---|---|
| 2015/0224981 | A1* | 8/2015 | Fujishiro | B60W 20/13 180/65.265 |
| 2015/0307083 | A1* | 10/2015 | Hisano | B60W 50/082 903/930 |
| 2019/0161069 | A1* | 5/2019 | Yui | B60L 50/61 |

FOREIGN PATENT DOCUMENTS

| | | | |
|---|---|---|---|
| CN | 109624962 | A | 4/2019 |
| JP | 2009-196472 | A | 9/2009 |
| JP | 2011-11714 | A | 1/2011 |
| JP | 2011-116241 | A | 6/2011 |
| JP | 2013-129380 | A | 7/2013 |
| JP | 2016-43908 | A | 4/2016 |
| WO | 2014/042007 | A1 | 3/2014 |

* cited by examiner

SERIES HYBRID VEHICLE CONTROL METHOD AND SERIES HYBRID VEHICLE CONTROL DEVICE

CROSS-REFERENCE TO RELATED APPLICATIONS

This application is a U.S. national stage application of International Application No. PCT/JP2020/030048, filed on Aug. 5, 2020.

BACKGROUND

Technical Field

The present invention relates to the control of a series hybrid vehicle.

Background Information

JP 2016-43908 A discloses a hybrid vehicle having a shift stage D and a shift stage B which has greater regenerative braking power than the shift stage D.

SUMMARY

If regenerative braking is limited when a battery becomes fully charged in a range in which the magnitude of the deceleration produced by regenerative braking of a drive motor is high (i.e., the magnitude of deceleration is high), charging of the battery is suppressed. However, limiting the regeneration will reduce the magnitude of deceleration. Thus, since the magnitude of deceleration will be reduced in ranges which have a high magnitude of deceleration, there is the risk that the driver will experience discomfort.

The present invention was devised in light of this problem and has as an object to prevent fully charging the battery in ranges in which there is a high magnitude of deceleration.

A control method for a series hybrid vehicle according to one aspect of the present invention comprises a first forward range and a second forward range, in which a battery is charged with electric power from an electric power generation motor that generates electric power by being driven by a drive power of an internal combustion engine and charged with electric power regenerated by a drive motor, electric power from the battery is used by the drive motor to drive a drive wheel, and the deceleration generated by the regenerative braking of the drive motor is set to be greater in the second forward range than in the first forward range, wherein the motoring of the internal combustion engine is started at an SOC of the battery that is lower in the second forward range than the SOC of the battery in the first forward range.

Another aspect of the present invention provides a series hybrid vehicle control device corresponding to the aforementioned series hybrid vehicle control method.

BRIEF DESCRIPTION OF THE DRAWINGS

Referring now to the attached drawings which form a part of this original disclosure.

DETAILED DESCRIPTION OF EMBODIMENTS

Embodiments of the present invention are described below with reference to the attached drawings.

Figure 1:
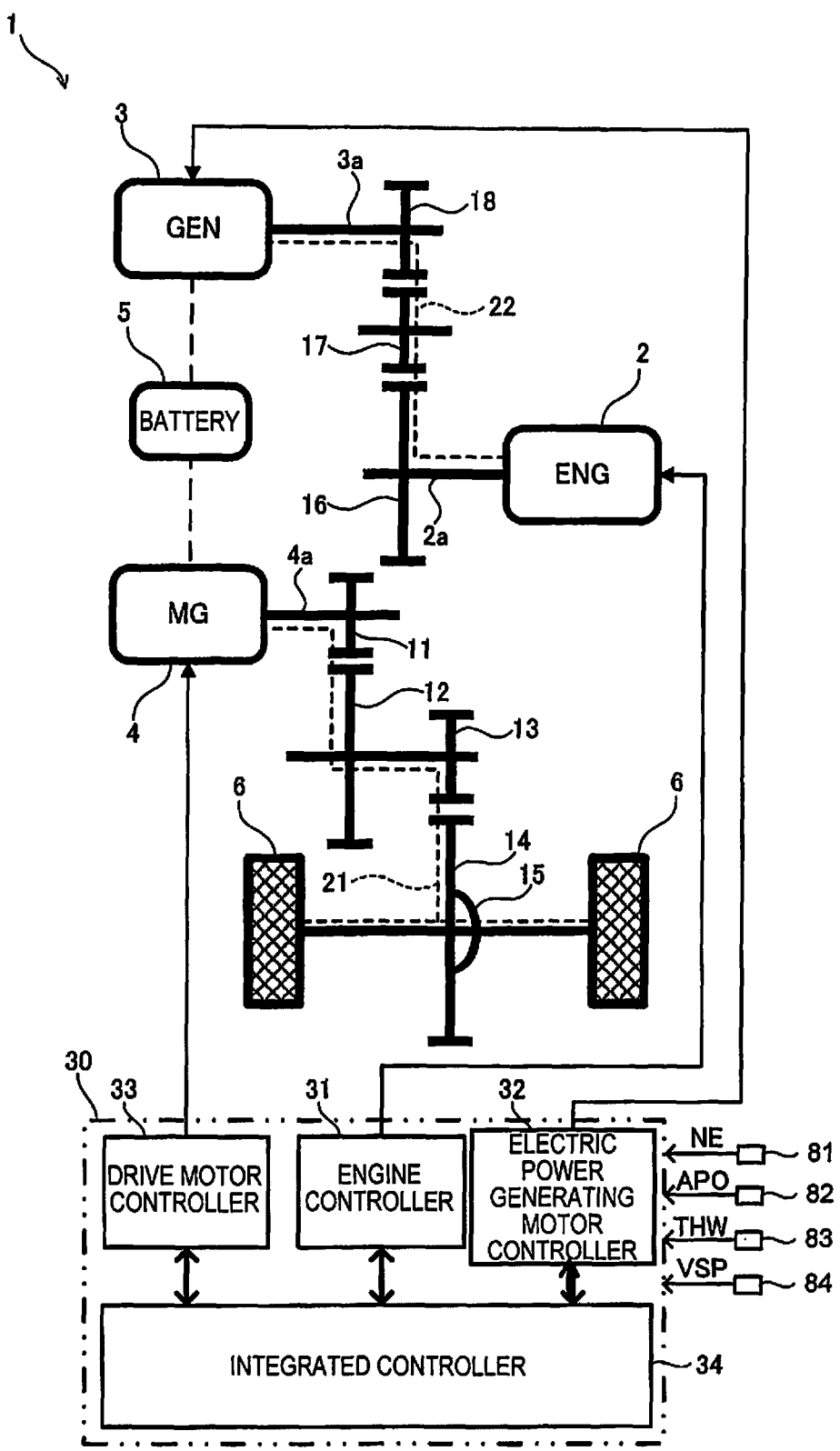
FIG. 1 is a schematic diagram showing the principal parts of a vehicle.

FIG. 1 is a schematic diagram showing the principal parts of a vehicle 1. The vehicle 1 is provided with an internal combustion engine 2, an electric power generating motor 3, a drive motor 4, a battery 5, and a pair of drive wheels 6.

The internal combustion engine 2 can be either a gasoline engine or a diesel engine. The electric power generating motor 3 generates electric power by being driven by the drive power from the internal combustion engine 2. The drive motor 4 is driven by electric power from the battery 5 and drives the drive wheels 6. The drive motor 4 also has what is known as a regenerative function, which regenerates deceleration energy as electric power by being driven by the rotation of the drive wheels 6 during deceleration, etc. The battery 5 is charged with electric power generated by the electric power generating motor 3 and the electric power regenerated by the drive motor 4.

The vehicle 1 has a first drive power transmission path 21 and a second drive power transmission path 22. The first drive power transmission path 21 transmits drive power between the drive motor 4 and the drive wheels 6. The second drive power transmission path 22 transmits drive power between the internal combustion engine 2 and the electric power generating motor 3. The first drive power transmission path 21 and the second drive power transmission path 22 are independent of each other, i.e., drive power is not transmitted from either the first drive power transmission path 21 or the second drive power transmission path 22 to the other.

The first drive power transmission path 21 consists of a first deceleration gear 11 which is provided on a rotary shaft 4a of the drive motor 4, a second deceleration gear 12 which meshes with the first deceleration gear 11, a third deceleration gear 13 which is provided coaxially with the second deceleration gear 12 and meshes with a differential gear 14, and the differential gear 14 which is provided in a differential housing 15.

The second drive power transmission path 22 consists of a fourth deceleration gear 16 which is provided on an output shaft 2a of the internal combustion engine 2, a fifth deceleration gear 17 which meshes with the fourth deceleration gear 16, and a sixth deceleration gear 18 which is provided on a rotary shaft 3a of the electric power generating motor 3 and meshes with the fifth deceleration gear 17.

Neither the first drive power transmission path 21 nor the second drive power transmission path 22 is provided with an element that blocks drive power transmission. In other words, both the first drive power transmission path 21 and the second drive power transmission path 22 are in a state in which drive power is transmitted continuously.

The vehicle 1 is further provided with a controller 30. The controller 30 consists of an engine controller 31 which carries out control of the internal combustion engine 2, an electric power generating motor controller 32 which carries out control of the electric power generating motor 3, a drive motor controller 33 which carries out control of the drive motor 4, and an integrated controller 34 which integrates control of the vehicle 1.

The engine controller 31 comprises a microcomputer which is provided with a central processing unit (CPU), a read-only memory (ROM), a random-access memory (RAM), and an input/output interface. The same applies to the electric power generating motor controller 32, the drive motor controller 33, and the integrated controller 34. The engine controller 31, the electric power generating motor controller 32, and the drive motor controller 33 are interconnected via the integrated controller 34 so as to communicate with each other by means of a CAN bus.

The controller 30 receives input signals from various sensors and switches, including a rotary speed sensor 81 for detecting rotational speed NE of the internal combustion engine 2; an accelerator pedal opening sensor 82 for detecting accelerator pedal opening APO, which indicates the amount of depression of the accelerator pedal; a water temperature sensor 83 for detecting water temperature THW of the internal combustion engine 2; and a vehicle speed sensor 84 for detecting vehicle speed VSP. These signals are input to the integrated controller 34 either directly or via other controllers, such as the engine controller 31.

The vehicle 1 constitutes a series hybrid vehicle, which drives the drive wheels 6 with the drive motor 4, using electric power from the electric power generating motor 3, which generates electric power when driven by the drive power of the internal combustion engine 2.

Figure 2:
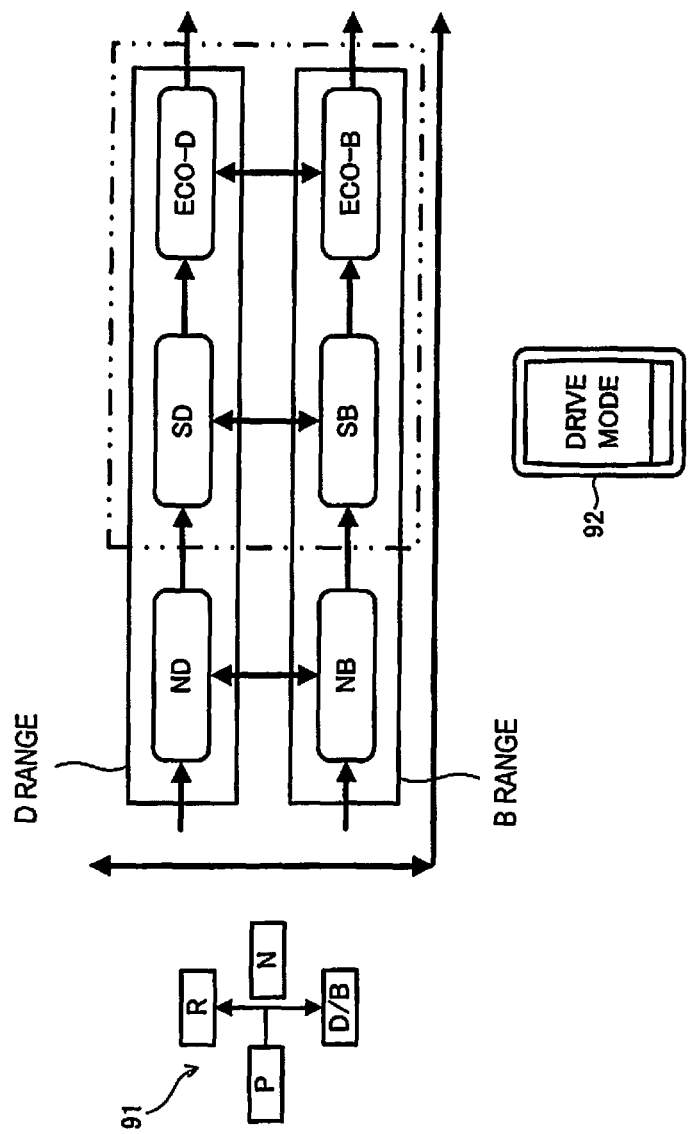
FIG. 2 illustrates the ranges and drive mode.

FIG. 2 illustrates the ranges and the drive mode. The vehicle 1 has a gearshift 91. The gearshift 91 is a device for switching between ranges by means of a driver operation which is performed by operating switches or gearshift lever into gates corresponding to the various ranges.

The gearshift 91 is a momentary shifter. With the momentary-type gearshift 91, the shift lever autonomously returns to a home position, which is the neutral position, once released from driver operation. The range selected by the driver operation is displayed on a range indicator provided in the vehicle interior, along with a drive mode, described below. The range indicator makes the selected range visible.

The ranges which can be selected by the gearshift 91 include a P range (park range), an R range (reverse range), and an N range (neutral range), as well as a D range, which is a first forward range, and a B range, which is a second forward range.

The D range and the B range are selected by an operation of the shift lever into a D/B gate, which is common to both. If the D range has been selected a shift lever operation into the D/B gate causes the B range to be selected, and if the B range has been selected a shift lever operation into the D/B gate causes the D range to be selected. If a range other than the D range or the B range has been selected a shift lever operation into the D/B gate causes the D range to be selected.

The vehicle 1 has a drive mode switch 92. The drive mode switch 92 changes the drive mode using a driver operation.

The drive modes include an N mode, an S mode, and an ECO mode. The N mode is a mode in which acceleration is performed by an accelerator pedal operation (normal mode). Therefore, regenerative deceleration is not carried out in N mode by an accelerator pedal operation. The S mode and the ECO mode are modes in which acceleration and regenerative deceleration are carried out by an accelerator pedal operation (one-pedal mode), the ECO mode being better suited to fuel-efficient driving than the S mode. The drive mode is changed in the order N mode-S mode-ECO mode each time the drive mode switch 92 is pressed. The mode returns to N mode after ECO mode.

In the vehicle 1, through combination with the selected drive mode, the D range constitutes an ND mode in combination with the N mode, an SD mode in combination with the S mode, and an ECO-D mode in combination with the ECO mode. Similarly, the B range constitutes an NB mode, an SB mode, and an ECO-B mode through combination with the selected drive mode.

The B range is a range in which the deceleration of the vehicle 1, which is produced through regenerative braking of the drive motor 4 when the accelerator pedal is in an off state, is greater than that in the D range. In other words, in the B range, the target deceleration is set higher than in the D range. Higher deceleration means that the magnitude of deceleration is higher (i.e., the absolute value of the deceleration is greater). The same applies to the target deceleration. In the B range, the absolute value of the regenerated electric power produced by the drive motor 4 is greater than that in the D range, resulting in a higher magnitude of deceleration.

In the B range, a target rotational speed NE_T of the internal combustion engine 2 driven by the electric power generating motor 3, i.e., the target rotational speed NE_T for motoring of the internal combustion engine 2, is set to be higher than in the D range. Therefore, the electric power consumption for motoring is greater in the B range than in the D range.

Once the battery 5 is fully charged in the B range, limiting the regeneration will suppress further charging of the battery 5. However, limiting the regeneration will decrease the magnitude of deceleration. Therefore, in this case, there is the concern that the driver will experience discomfort because the magnitude of deceleration will be reduced in the B range, which has a high magnitude of deceleration.

In view of this circumstance, pre-motoring, described below, is performed in the present embodiment.

Figure 3:
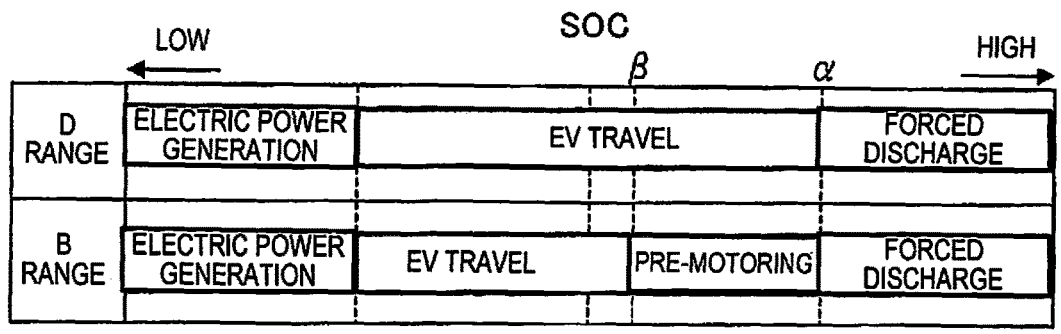
FIG. 3 illustrates the operations related to an electric power generation motor, including pre-motoring.

FIG. 3 illustrates the operations related to the electric power generating motor 3 including pre-motoring. FIG. 3 shows operations related to the electric power generating motor 3 corresponding to the SOC (state of charge) of the battery 5, which is a parameter indicating the state of charge of the battery 5, for the D range and the B range. FIG. 3 shows a case in which the operation modes (charging mode, EV mode) related to the electric power generating motor 3, described further below, has been selected by a driver operation.

In the D range, electric power generation, EV travel, and forced discharge are carried out in that order from low to high SOC. In electric power generation, the electric power generating motor 3 generates electric power through the drive power of the internal combustion engine 2. In EV travel, the drive motor 4 drives the drive wheels 6 using the electric power accumulated in the battery 5, and the electric power generating motor 3 does not carry out electric power generation or discharging. In forced discharge, the electric power generating motor 3 carries out discharging by driving the internal combustion engine 2, i.e., motoring.

Forced discharge is performed by forcibly, or in a prioritized manner, carrying out motoring in accordance with the SOC. Forced discharge is initiated in cases in which the SOC is at or above a prescribed value α. Forced discharge is referred to as forced discharge motoring below.

In the B range, electric power generation, EV travel, pre-motoring, and forced discharge are performed in that order from low to high SOC. Pre-motoring is performed by initiating motoring in the B range at a lower SOC than in the D range. Therefore, pre-motoring is started at a prescribed value which is lower than the prescribed value α. Pre-motoring, like forced discharge, is performed forcibly, or in a prioritized manner, in accordance with the SOC.

In the B range, as the SOC increases, EV travel and forced discharge are initiated at the same SOC as in the D range. In the B range, EV travel is stopped at an SOC lower than in the D range by an amount proportional to the pre-motoring which is being performed.

Figure 4:
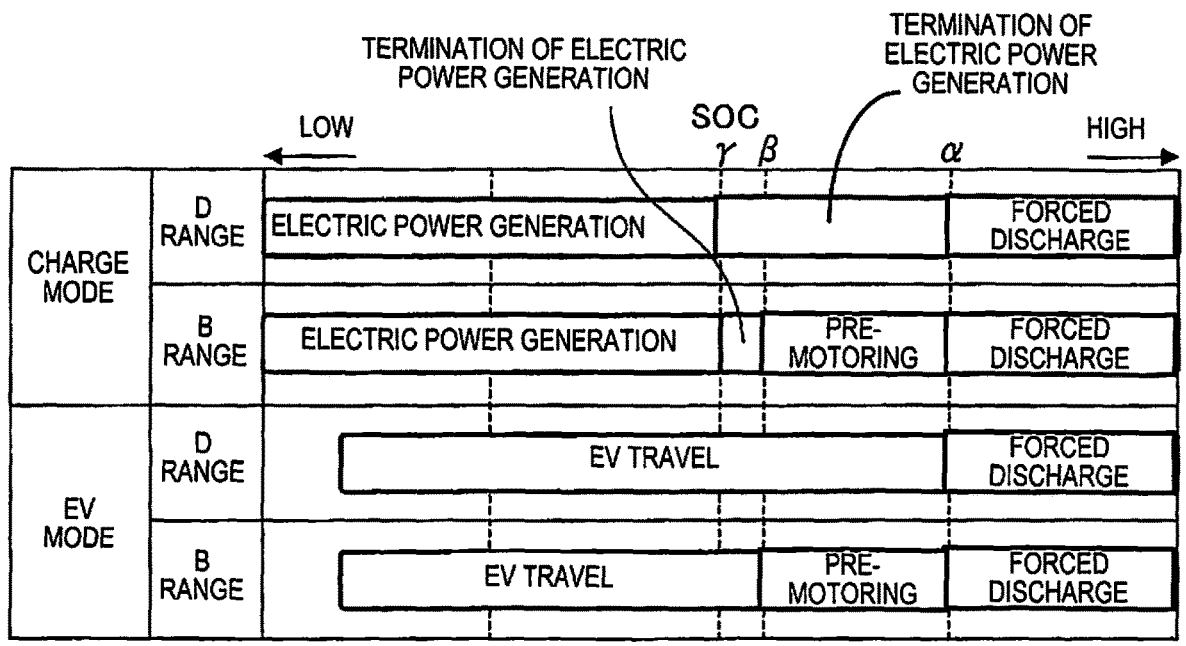
FIG. 4 illustrates the operations relating to the electric power generation motor corresponding to operating modes.

FIG. 4 illustrates the operations relating to the electric power generating motor 3 corresponding to the operating mode. The vehicle 1 has a charge mode and an EV mode as the operating modes related to the electric power generating motor 3.

The charging mode is an operating mode in which charging of the battery 5 is required. The EV mode is an operating mode in which EV travel is required. The charge mode is selected by turning on a charge switch. The EV mode is selected by turning on an EV switch. Operating modes can be enabled and disabled by enabling the most recently selected operating mode, for example. In this case, the operating mode which had been selected can be disabled.

In charging mode and the D range, electric power generation, termination of electric power generation, and forced discharge are performed in that order from low to high SOC. When electric power generation is stopped, the internal combustion engine 2 is stopped, and the electric power generating motor 3 does not carry out electric power generation. When electric power generation is stopped, the electric power generating motor 3 does not carry out discharging, either. In charge mode and the B range, electric power generation, termination of electric power generation, pre-motoring, and forced discharge are performed sequentially in that order. In charge mode, EV travel is not performed in a manner based on the charge mode.

In charge mode, the charge switch is kept on even if pre-motoring or forced discharge are initiated. Therefore, pre-motoring and forced discharge are given priority over demands for electric power generation based on the charge mode. The order of priority of electric power generation and discharge requirements for the electric power generating motor 3 are described further below in detail.

In EV mode and the D range, EV travel and forced discharge are performed in that order from low to high SOC. In EV mode and the B range, EV travel, pre-motoring, and forced discharge are performed sequentially in that order. In EV mode, electric power generation is not set, and the termination of electric power generation is also not set since EV travel is demanded.

In EV mode, when pre-motoring or forced discharge is initiated, the EV mode is turned on, i.e., the selection is canceled and EV mode is disabled. Therefore, in EV mode, pre-motoring and forced discharge are given priority over selection of EV mode. Selection of EV mode requiring EV travel could be said to be a request to terminate electric power generation and discharging, in terms of electric power demand. Therefore, in EV mode, pre-motoring and forced discharge are given priority over demand for electric power based on EV mode.

In both charge mode and EV mode, the SOC at which forced discharge is started is the same prescribed value α in the D range and the B range. Furthermore, the SOC at which pre-motoring is initiated is the same prescribed value β for the B range in charge mode and the B range in EV mode. The prescribed value β is greater than a prescribed value γ, which is an upper limit SOC at which electric power generation is continued in the charge mode. The prescribed value γ is defined as an SOC at which EV travel can be maintained for a prescribed distance. The prescribed distance is determined, for example, by a travel distance in urban areas that should be driven with low noise.

Therefore, in the B range, the transition from electric power generation to pre-motoring is made by terminating electric power generation. Therefore, there is no need to start driving the internal combustion engine 2 using the electric power generating motor 3 immediately after stopping the operation of the internal combustion engine 2 which had been engaged in the electric power generation operation. This avoids large fluctuations in the rotational speed NE resulting from changes in the rotational speed NE between electric power generation and pre-motoring.

In other words, by setting the prescribed value β to be greater than the prescribed value γ, large fluctuations in the rotational speed NE caused by switching from electric power generation to pre-motoring in the B range, which results in driver discomfort, can be prevented. Furthermore, wasteful energy consumption also can be prevented by repeatedly alternating between electric power generation and discharging.

The upper limit SOC at which electric power generation is maintained in charge mode is the same prescribed value γ in the D range and the B range.

Therefore, even in cases in which the range has been switched to the B range during electric power generation in the D range, pre-motoring is not started. Therefore, by switching to the B range, there is no need to drive the internal combustion engine 2 using the electric power generating motor 3 immediately after stopping operation of the internal combustion engine 2, which had been generating electrical power. The risk of causing large fluctuations in rotational speed NE as a result of the rotational speed NE changing between electrical power generation and pre-motoring can thus be avoided.

Further, electric power generation is not initiated even in cases in which the range has been switched to the D range during pre-motoring in the B range. Therefore, by switching to the D range, there is no need to start electric power generation operation of the internal combustion engine 2 immediately after stopping driving of the internal combustion engine 2 which had been driven by the electric power generating motor 3. As a result, the risk of large fluctuations in the rotational speed NE is avoided in this case as well.

In other words, by setting the upper limit SOC at which electric power generation is continued in charge mode to the same prescribed value γ in the D range and the B range, large fluctuations in rotational speed NE caused by switching between the B range and the D range, which results in driver discomfort, are prevented. Furthermore, wasting energy in the B range by needlessly discharging electric power charged in the D range is also prevented.

A switch between the B range and the D range in charge mode also causes a transition to a different operation, from either termination of electric power generation or pre-motoring to the other operation. In this case, there is no risk of large fluctuations in rotational speed NE since either the internal combustion engine 2, which had been stopped, is driven by the electric power generating motor 3, or the internal combustion engine 2, which had been driven by the electric power generating motor 3, is no longer driven.

Next, processing performed by the integrated controller 34 is described.

Figure 5:
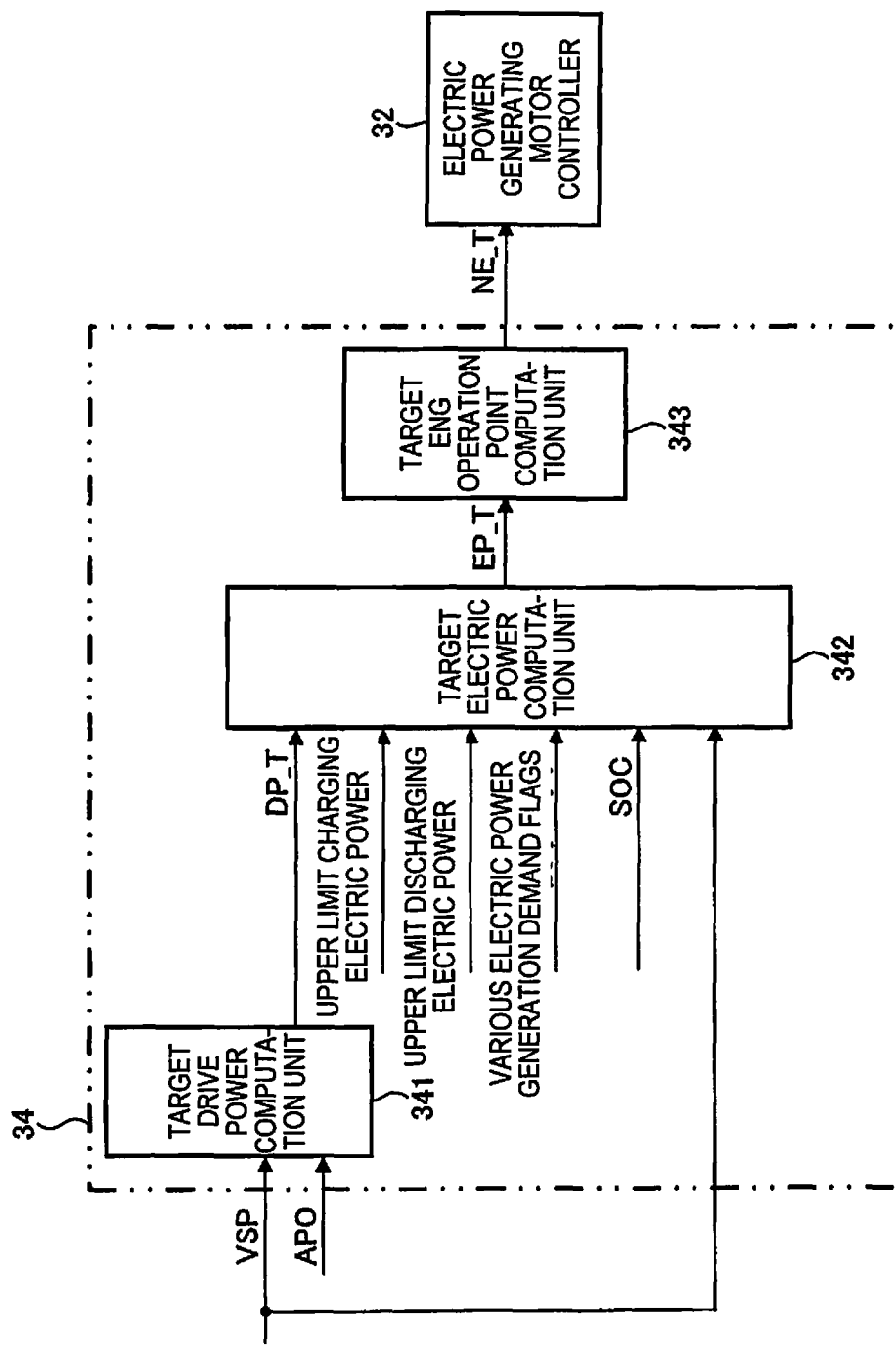
FIG. 5 is a block diagram showing processing performed by an integrated controller.

FIG. 5 is a block diagram showing the processing performed by the integrated controller 34. FIG. 5 shows a process for computing target rotational speed NE_T of the electric power generating motor 3. The integrated controller 34 has a target drive power computation unit 341, a target electric power computation unit 342, and a target ENG operation point computation unit 343.

The target drive power computation unit 341 computes a target drive power DP_T of the drive motor 4 based on the vehicle speed VSP and the accelerator pedal opening APO. The target drive power DP_T can be set ahead of time using map data corresponding to the vehicle speed VSP and the accelerator pedal opening APO. In the target drive power computation unit 341, a negative target drive power DP_T, i.e., a target regeneration power, is computed during regeneration. The target drive power DP_T thus computed is input to the target electric power computation unit 342. Note that the target drive power DP_T is also input to the drive motor controller 33, not shown in FIG. 3. The drive motor controller 33 controls the drive torque of the drive motor 4 based on the target drive power DP_T.

The target electric power computation unit 342 computes a target electric power EP_T for electric power generation or discharging by the electric power generating motor 3 based on the target drive power DP_T. During electric power generation, the electric power generating motor 3 is driven by the internal combustion engine 2, and during discharging, the internal combustion engine 2 is driven by the electric power generating motor 3, i.e., motoring is performed.

When a positive target drive power DP_T is input, the target electric power EP_T for electric power generation is computed in the target electric power computation unit 342. The target electric power EP_T for electric power generation is corrected by, for example, adding the electric power corresponding to various electric power generation demand flags. The target electric power EP_T for electric power generation is computed with the upper limit charging power as the upper limit.

When a negative target drive power DP_T is input, the target electric power EP_T for discharging is computed in the target electric power computation unit 342. The target electric power EP_T for discharging is computed with the absolute value of the upper limit discharge power as the upper limit.

The SOC is a parameter which indicates the state of charge of the battery 5 and is used in calculating the target electric power EP_T for discharging. The target electric power computation unit 342 will be described further below. The target electric power EP_T thus computed is input to the target ENG operation point computation unit 343.

The target ENG operation point computation unit 343 computes a target operation point of the internal combustion engine 2 based on the target electric power EP_T. The target operation point can be set ahead of time using map data corresponding to the target electric power EP_T. When discharging is performed, i.e., motoring, the target rotational speed NE_T is computed as the target operation point in the target ENG operation point computation unit 343. The target rotational speed NE_T thus computed is input to the electric power generating motor controller 32.

The electric power generating motor controller 32 controls the electric power generating motor 3 based on the input target rotational speed NE_T. This causes motoring of the internal combustion engine 2, and power consumption, i.e., the discharging of electric power. The electric power generating motor controller 32 and the integrated controller 34 correspond to the control unit.

Next, the target electric power computation unit 342 will be described further, assuming a case in which the range is the B range.

Figure 6:
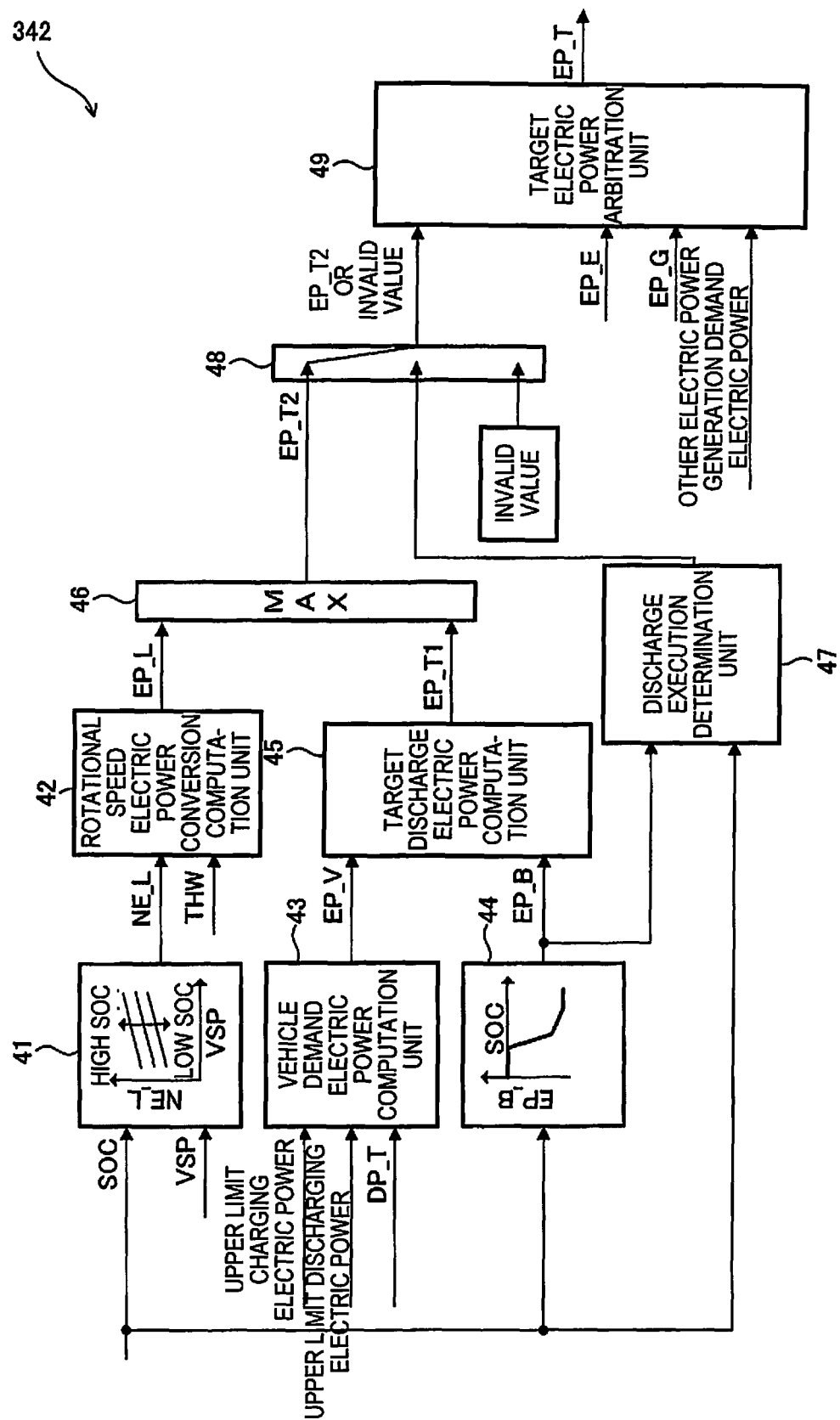
FIG. 6 is a block diagram showing processing performed by a target electric power computation unit.

FIG. 6 is a block diagram showing processing performed by the target electric power computation unit 342. The target electric power computation unit 342 is provided with a pre-motoring upper limit rotational speed computation unit 41, a rotational speed electric power conversion computation unit 42, a vehicle demand electric power computation unit 43, a battery demand discharge electric power computation unit 44, a target discharge electric power computation unit 45, a target discharge electric power limitation unit 46, a discharge execution determination unit 47, an enable/disable switching unit 48, and a target electric power arbitration unit 49.

The pre-motoring upper limit rotational speed computation unit 41 computes an upper limit rotational speed NE_L for pre-motoring. The upper limit rotational speed NE_L is the upper limit rotational speed for pre-motoring corresponding to the SOC and the vehicle speed VSP and is computed using map data, described below.

Figure 7:
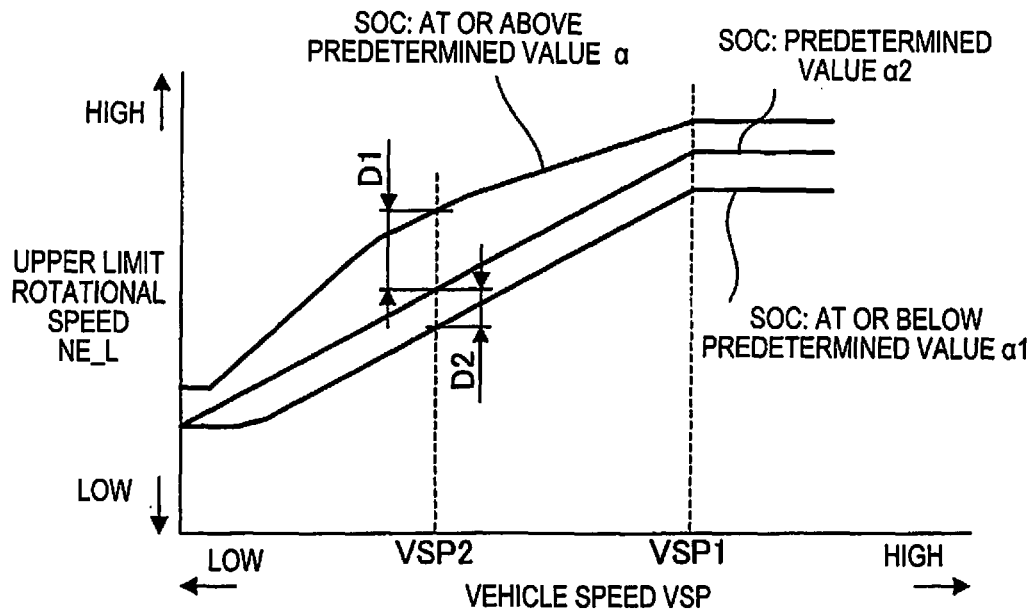
FIG. 7 is a diagram showing an example of pre-motoring upper limit rotational speed map data.
Figure 8:
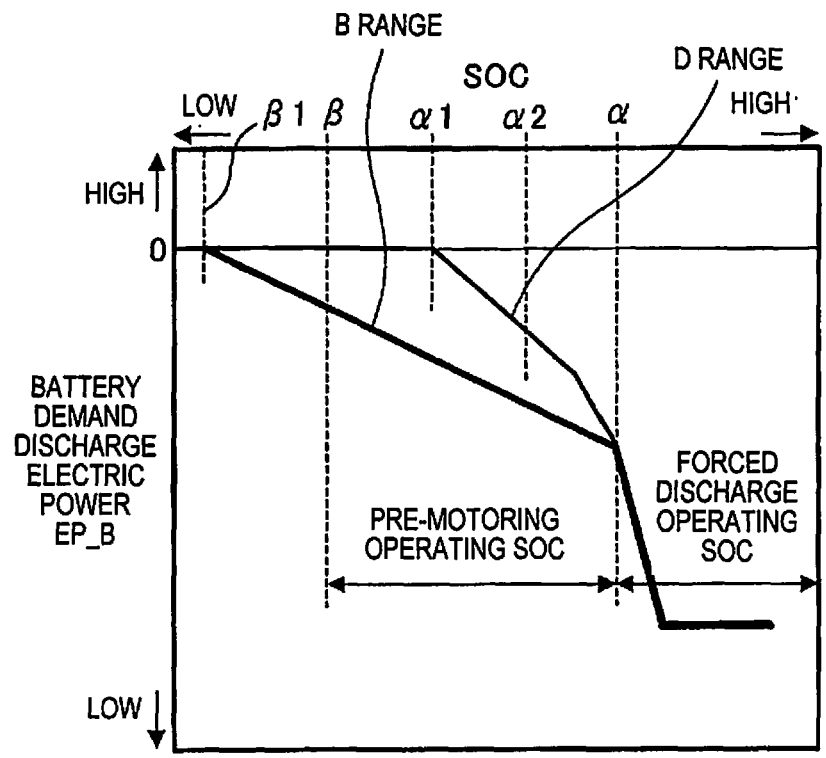
FIG. 8 is a diagram showing battery required discharge electric power corresponding to SOCs.

FIG. 7 is a diagram showing one example of map data for the upper limit rotational speed NE_L. FIG. 8 is a diagram showing the battery demand discharge electric power EP_B.

First, FIG. 8 is described. The battery demand discharge electric power EP_B is the discharge electric power of the battery 5 demanded in accordance with the SOC. In the D range, discharging is demanded once the SOC reaches or exceeds the prescribed value α. Therefore, in the D range, any SOC at or above the prescribed value α is a forced discharge operation SOC on the start side.

In the D range, forced discharge is stopped once the SOC falls to or below a prescribed value α1. The prescribed value α1 is the SOC at which forced discharge is stopped in the D range. Therefore, if the SOC is at or below the prescribed value α1 in the D range, the battery demand discharge electric power EP_B is zero. The prescribed value α1 is lower than the prescribed value α and higher than the prescribed value β.

If the SOC is greater than the prescribed value α1 in the D range, the absolute value of the battery demand discharge electric power EP_B is set to increase with the higher the SOC. A prescribed value α2 indicates an SOC which is the median of the prescribed value α1 and the prescribed value α.

In the B range, discharge is demanded when the SOC reaches or exceeds the prescribed value β. In the B range, an SOC greater than or equal to the prescribed value β and less than the prescribed value α is a pre-motoring operation SOC on the start side, and any SOC greater than or equal to the prescribed value α is a forced discharge operation SOC on the start side.

If the SOC is greater than or equal to the prescribed value α, the battery demand discharge electric power EP_B is the same in the B range and the D range. If the SOC reaches or exceeds the prescribed value α, pre-motoring is switched to forced discharge simply by continuing the motoring which had been started in pre-motoring as is.

In the B range, pre-motoring is stopped once the SOC falls to or below a prescribed value β1. The prescribed value β1 is the SOC at which pre-motoring is stopped in the B range and is lower than the prescribed value β.

The prescribed value β1 is set higher than the prescribed value γ described above with reference to FIG. 4. Therefore, the transition from pre-motoring to electric power generation is made by stopping electric power generation. As a result, driver discomfort due to large fluctuations in rotational speed NE during the transition from pre-motoring to electric power generation can be prevented. Furthermore, by repeatedly alternating between electric power generation and discharging, wasteful consumption of energy can also be prevented.

If the SOC is greater than the prescribed value β1 in the B range, the absolute value of the battery demand discharge power EP_B is set to increase as the SOC rises. The battery demand discharge electric power EP_B is set without a step-wise change at the prescribed value α at which forced discharge is started. In the B range, the motoring operation region on the start side is expanded relative to the D range by an amount proportional to the pre-motoring operation SOC.

In view of the above, three pre-motoring upper limit rotational speeds NE_L are given: when the SOC is at or below the prescribed value α1, at the prescribed value α2, and at or above the prescribed value α. In the B range, the battery demand discharge electric power EP_B is not zero at the prescribed value α1, and therefore the upper limit rotational speed NE_L of the pre-motoring is set.

As described above with reference to FIG. 8, the absolute value of the battery demand discharge electric power EP_B increases with rising SOC. Therefore, in order to discharge the battery demand discharge electric power EP_B, discharging through pre-motoring must be increased with rising SOC.

Therefore, the rotational speed NE increases with rising SOC during pre-motoring, and the upper limit rotational speed NE_L of pre-motoring is set to increase with rising SOC in a corresponding manner. The upper limit rotational speed NE_L of pre-motoring is set higher, the greater the SOC, when compared with the same vehicle speed VSP.

The absolute value of the regeneration electric power of the drive motor 4 increases, with vehicle speed VSP. Therefore, in order to maintain a particular SOC, discharging through pre-motoring must be increased as the vehicle speed VSP increases.

Therefore, during pre-motoring, the rotational speed NE corresponding to the SOC increases with vehicle speed VSP, and the upper limit rotational speed NE_L corresponding to a particular SOC is also set higher as vehicle speed VSP increases, in a corresponding manner.

The regeneration electric power of the drive motor 4 reaches its maximum as an absolute value when the vehicle speed VSP reaches or exceeds a prescribed vehicle speed VSP1. The prescribed vehicle speed VSP1 is the vehicle speed VSP once the regenerated electric power has reached its maximum as an absolute value. In this case, there is no need to increase discharging through pre-motoring in order to maintain a particular SOC. Therefore, if the vehicle speed VSP is at or above the prescribed vehicle speed VSP1, the upper limit rotational speed NE_L is a constant value. A prescribed vehicle speed VSP2, an interval D1, and an interval D2 will be described further below.

Returning to FIG. 6, the upper limit rotational speed NE_L is computed in the pre-motoring upper limit rotational speed computation unit 41 by reading the upper limit rotational speed NE_L corresponding to the input SOC and the vehicle speed VSP from the map data. The upper limit rotational speed NE_L thus computed is input to the rotational speed electric power conversion computation unit 42.

The rotational speed electric power conversion computation unit 42 converts the upper limit rotational speed NE_L into an upper limit discharge electric power EP_L for pre-motoring. The upper limit discharge electric power EP_L is computed based on the upper limit rotational speed NE_L and the water temperature THW of the internal combustion engine 2. The upper limit discharge electric power EP_L thus computed is input to the target discharge electric power limitation unit 46.

The vehicle demand electric power computation unit 43 computes a vehicle demand electric power EP_V. The vehicle demand electric power EP_V is the demand electric power of the vehicle 1 corresponding to the target drive power DP_T and is computed based on the target drive power DP_T.

When a positive target drive power DP_T is input, a positive vehicle demand electric power EP_V, i.e., the vehicle demand electric power EP_V for electric power generation, is computed by the vehicle demand electric power computation unit 43. The vehicle demand electric power EP_V for electric power generation is computed with the upper limit charging electric power as an upper limit.

When a negative target drive power DP_T is input, a negative vehicle demand electric power EP_V, i.e., the vehicle demand electric power EP_V for discharging, is computed by the vehicle demand electric power computation unit 43. The vehicle demand electric power EP_V for discharge is computed as an absolute value with the upper limit discharge electric power as an upper limit. The vehicle demand electric power EP_V thus computed is input to the target discharge electric power computation unit 45.

The battery demand discharge electric power computation unit 44 computes the battery demand discharge electric power EP_B. The battery demand discharge electric power EP_B is computed by reading the battery demand discharge electric power EP_B corresponding to the input SOC from the map data shown in FIG. 8 described above. If the range is the B range, the battery demand discharge electric power EP_B for the B range is referenced in the map data, as shown in FIG. 8. The battery demand discharge electric power EP_B thus computed is input to the target discharge electric power computation unit 45.

The target discharge electric power computation unit 45 computes a target discharge electric power EP_T1 for the electric power generating motor 3. The target discharge electric power EP_T1 is computed as described below.

Figure 9:
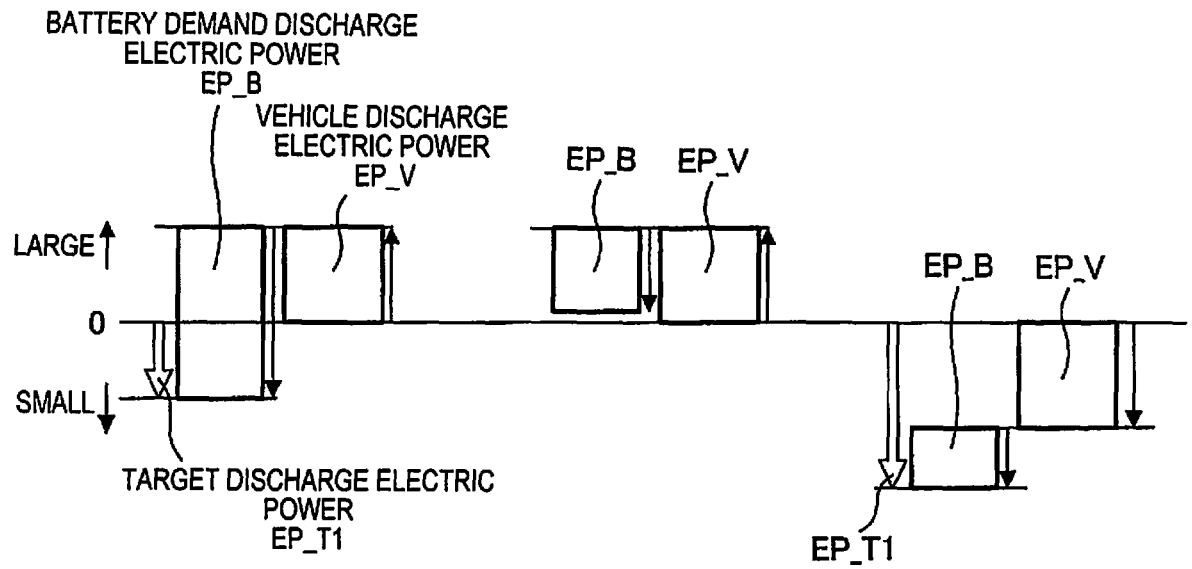
FIG. 9 is an explanatory diagram of computations performed by a target discharge electric power computation unit.

FIG. 9 is an illustration of computations performed by the target discharge electric power computation unit 45.

The diagram on the left in FIG. 9 shows a case in which the driver request is a drive request, and the magnitude of the battery demand discharge electric power EP_B is greater than the magnitude of the vehicle demand electric power EP_V. In this case, the vehicle demand electric power EP_V based on the driver's request for driving is insufficient to consume the battery demand discharge electric power EP_B.

Therefore, in this case, the computation involves calculating a negative-value target discharge electric power EP_T1, as shown in the drawing, by adding a negative-value battery demand discharge electric power EP_B to a positive-value vehicle demand electric power EP_V.

The middle diagram in FIG. 9 shows a case in which the driver request is a drive request and the magnitude of the battery demand discharge electric power EP_B is smaller than the magnitude of the vehicle demand electric power EP_V. In this case, the vehicle demand electric power EP_V is sufficient to consume the battery demand discharge electric power EP_B. Therefore, in this case the target discharge electric power EP_T1 is zero.

The right-hand diagram in FIG. 9 shows a case in which the driver request is a request for regeneration. In this case, the vehicle demand electric power EP_V is a negative value, and regeneration is performed based on the vehicle demand electric power EP_V in the drive motor 4. Therefore, in this case, the vehicle demand electric power EP_V is insufficient to consume the battery demand discharge electric power EP_B.

In this case, the computation involves calculating a negative-value target discharge electric power EP_T1, as shown in the drawing, by adding a negative-value battery demand discharge electric power EP_B to a negative-value vehicle demand electric power EP_V.

The absolute value of the negative-value vehicle demand electric power EP_V increases with the magnitude of deceleration. This is because the absolute value of the regenerated electric power of the electric power generating motor 3 increases with the magnitude of deceleration. As a result, the absolute value of the target discharge electric power EP_T1 also increases with deceleration.

In other words, the greater the deceleration, the greater the rotational speed NE of motoring. The rotational speed NE of motoring increases with deceleration, when said speed is not limited to the upper limit rotational speed NE_L, as will be described below, in the target discharge electric power limitation unit 46 shown in FIG. 6. The rotational speed NE of motoring increases further with increasing deceleration in cases in which a target discharge electric power EP_T2, described below (i.e., the target discharge electric power EP_T1 after processing has been performed by the target discharge electric power limitation unit 46), has been selected as the target electric power EP_T, in the target electric power arbitration unit 49 shown in FIG. 6.

In the target discharge electric power computation unit 45, if the sum of the vehicle demand electric power EP_V and the battery demand discharge electric power EP_B is negative, the target discharge electric power EP_T1 is computed by adding the battery demand discharge electric power EP_B to the vehicle demand electric power EP_V. Further, if the sum of the vehicle demand electric power EP_V and the battery demand discharge electric power EP_B is positive, the target discharge electric power EP_T1 is zero.

Returning to FIG. 6, the target discharge electric power EP_T1 computed as described above is input from the target discharge electric power computation unit 45 to the target discharge electric power limitation unit 46.

The target discharge electric power limitation unit 46 limits the target discharge electric power EP_T1 using the upper limit discharge electric power EP_L for pre-motoring.

The target discharge electric power limitation unit 46 limits the target discharge electric power EP_T1 using the upper limit discharge electric power EP_L by selecting the electric power of the greater of the target discharge electric power EP_T1 and the upper limit discharge electric power EP_L.

If the target discharge electric power EP_T1 is greater than the upper limit discharge electric power EP_L, the magnitude of the target discharge electric power EP_T1 does not exceed the magnitude of the upper limit discharge electric power EP_L. In this case, the target discharge electric power EP_T1 is selected, and the target discharge electric power EP_T1 is not limited to the upper limit discharge electric power EP_L.

If the target discharge electric power EP_T1 is smaller than the upper limit discharge electric power EP_L, the magnitude of the target discharge electric power EP_T1 exceeds the magnitude of the upper limit discharge electric power EP_L. In this case, the upper limit discharge electric power EP_L is selected, and the target discharge electric power EP_T1 is limited to the upper limit discharge electric power EP_L.

The target discharge electric power EP_T2 is input to the enable/disable switching unit 48 from the target discharge electric power limitation unit 46. The target discharge electric power EP_T2 is the target discharge electric power EP_T1 after processing performed by the target discharge electric power limitation unit 46.

The discharge execution determination unit 47 determines the execution of discharging based on the battery demand discharge electric power EP_B and the SOC. The discharge execution determination unit 47 determines the execution of discharging by referencing the map data shown in FIG. 8 described above. If the range is the B range, the battery demand discharge electric power EP_B is referenced for the B range in the map data shown in FIG. 8. The determination result is input to the enable/disable switching unit 48.

The enable/disable switching unit 48 switches between enabling and disabling the target discharge electric power EP_T2. If a determination result indicating the execution of discharging is input, the target discharge electric power EP_T2 is selected in the enable/disable switching unit 48. As a result, the target discharge electric power EP_T2 is enabled.

If a determination result indicating no execution of discharging is input, an invalid value is selected in the enable/disable switching unit 48, and the target discharge electric power EP_T2 is disabled. The invalid value is a value selected by the target electric power arbitration unit 49, described further below. The target discharge electric power EP_T2 or the invalid value is input to the target electric power arbitration unit 49 from the enable/disable switching unit 48.

The target electric power arbitration unit 49 arbitrates the target electric power EP_T by selecting the target electric power EP_T in accordance with priority between the input target discharge electric power EP_T2 and other demand electric power. The other demand electric power is engine braking discharge demand electric power EP_E, drive power lower limit electric power generation demand electric power EP_G, and other electric power generation demand electric power. The other electric power generation demand electric power is electric power generation demand electric power other than the drive power lower limit electric power generation demand electric power EP_G, including electric power demand for electric power generation based on the charge mode, for example. The other demand electric power can include demand electric power based on the EV mode.

Figure 10:
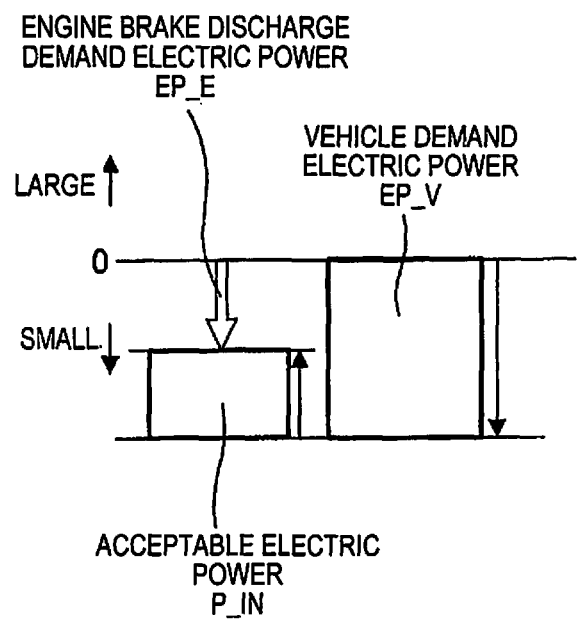
FIG. 10 is an explanatory diagram of engine braking discharge demand electric power.

FIG. 10 is an illustration of engine braking discharge demand electric power EP_E. The engine braking discharge demand electric power EP_E is the electric power required to cause motoring to consume any regeneration demand electric power exceeding an acceptable electric power P_IN of the battery 5 when the driver requests regeneration, i.e., a negative vehicle demand electric power EP_V. Therefore, the engine braking discharge demand electric power EP_E is computed by making the acceptable electric power P_IN a positive value and adding the positive-value acceptable electric power P_IN to the negative-value vehicle demand electric power EP_V.

Figure 11:
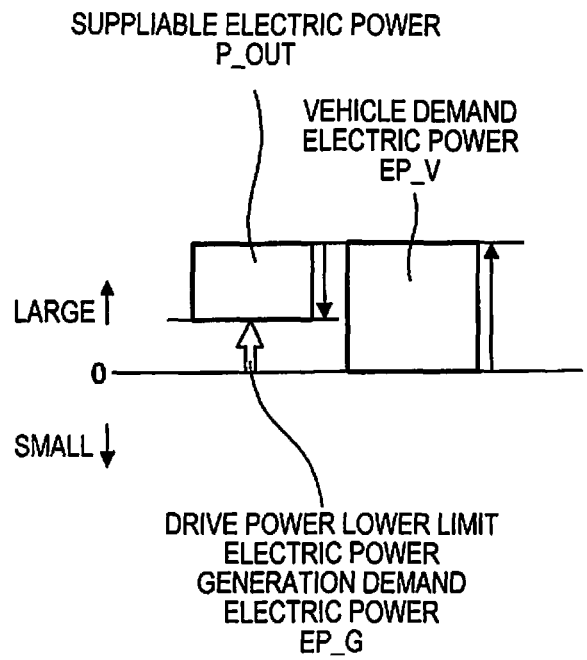
FIG. 11 is an explanatory diagram of drive power lower limit electric power generation demand electric power.

FIG. 11 is an illustration of the drive power lower limit electric power generation demand electric power EP_G. The drive power lower limit electric power generation demand electric power EP_G is the electric power required to cause the electric power generating motor 3 to generate drive power demand electric power exceeding a suppliable electric power P_OUT of the battery 5 when the driver request is for drive power, i.e., a positive vehicle demand electric power EP_V. Therefore, the drive power lower limit electric power generation demand electric power EP_G is computed by making the suppliable electric power P_OUT a negative value and adding the negative-value suppliable electric power P_OUT to the positive-value vehicle demand electric power EP_V.

Figure 12:
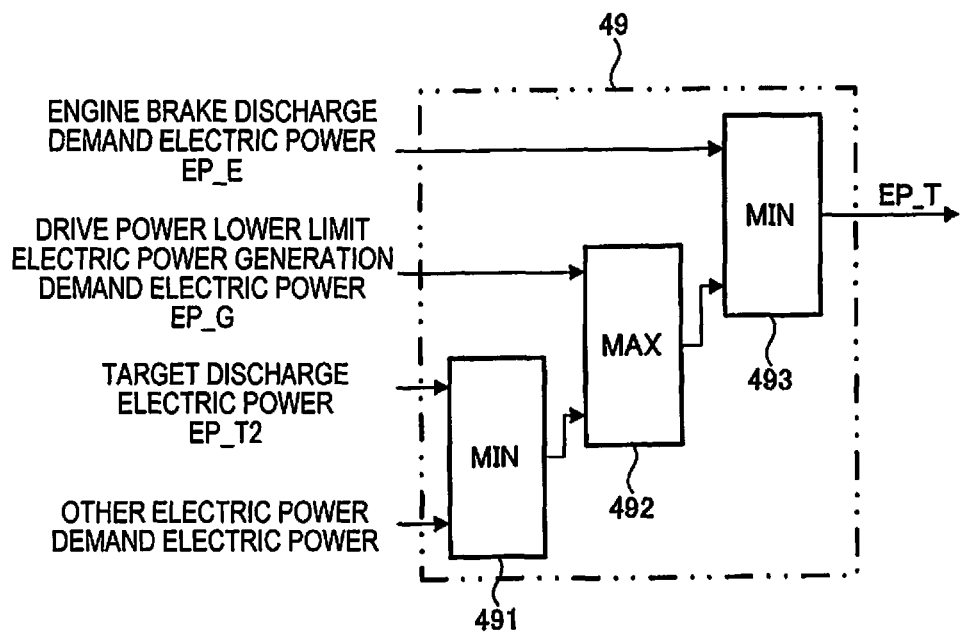
FIG. 12 is a block diagram showing processing performed by a target electric power arbitration unit.

FIG. 12 is a block diagram showing processing performed by a target arbitration unit 49. The target electric power arbitration unit 49 has a first selection unit 491, a second selection unit 492, and a third selection unit 493.

The first selection unit 491 selects the electric powefof the smaller of the target discharge electric power EP_T2 and the other electric power generation demand electric power. The target discharge electric power EP_T2 is a negative value, and the other electric power generation demand electric power is a positive value. Therefore, the first selection unit 491 selects the target discharge electric power EP_T2 when the target discharge electric power EP_T2 is present. Therefore, the target discharge electric power EP_T2 has higher priority than the other electric power generation demand electric power.

If there is no target discharge electric power EP_T2, the invalid value is input to the first selection unit 491 instead of the target discharge electric power EP_T2. The invalid value is set to a value which is not selected during computation (e.g., the maximum value which can be set in computation). The same applies if there is no engine braking discharge demand electric power EP_E, if there is no drive power lower limit electric power generation demand electric power EP_G, and if there is no other electric power generation demand electric power. The selection result from the first selection unit 491 is input to the second selection unit 492.

The second selection unit 492 selects the electric power of the greater of the drive power lower limit electric power generation demand electric power EP_G and the selection result from the first selection unit 491. If the selection result from the first selection unit 491 is the target discharge electric power EP_T2, the second selection unit 492 selects a positive-value drive power lower limit electric power generation demand electric power EP_G. Therefore, the drive power lower limit electric power generation demand electric power EP_G has higher priority than the target discharge electric power EP_T2. The selection result from the second selection unit 492 is input to the third selection unit 493.

The third selection unit 493 selects the electric power of the smaller of the engine braking discharge demand electric power EP_E and the selection result of the second selection unit 492. If the selection result from the second selection unit 492 is the drive power lower limit electric power generation demand electric power EP_G, the third selection unit 493 selects a negative-value engine braking discharge demand electric power EP_E. Therefore, the engine braking discharge demand electric power EP_E has higher priority than the drive power lower limit electric power generation demand electric power EP_G. The selection result from the third selection unit 493 is determined as the final target electric power EP_T and is output from the target electric power arbitration unit 49.

As described above, the order of priority for the determination of the target electric power EP_T in the targeted electric power arbitration unit 49 is engine braking discharge demand electric power EP_E> drive power lower limit electric power generation demand electric power EP_G> target discharge electric power EP_T2> other electric power generation demand electric power.

Therefore, the pre-motoring which is performed based on the target discharge electric power EP_T2 is performed forcibly before the other electric power generation demands if there is no engine braking discharge demand electric power EP_E and drive power lower limit electric power generation demand electric power EP_G. The target electric power arbitration unit 49 may also be configured such that the order of priority is target discharge electric power EP_T2> other discharge demand electric power (discharge demand electric power other than the engine braking discharge demand electric power EP_E).

Next, the process by the target electric power arbitration unit 49, including the relationship between the upper limit discharge electric power EP_L and the engine braking discharge demand electric power EP_E, will be described.

Figure 13:
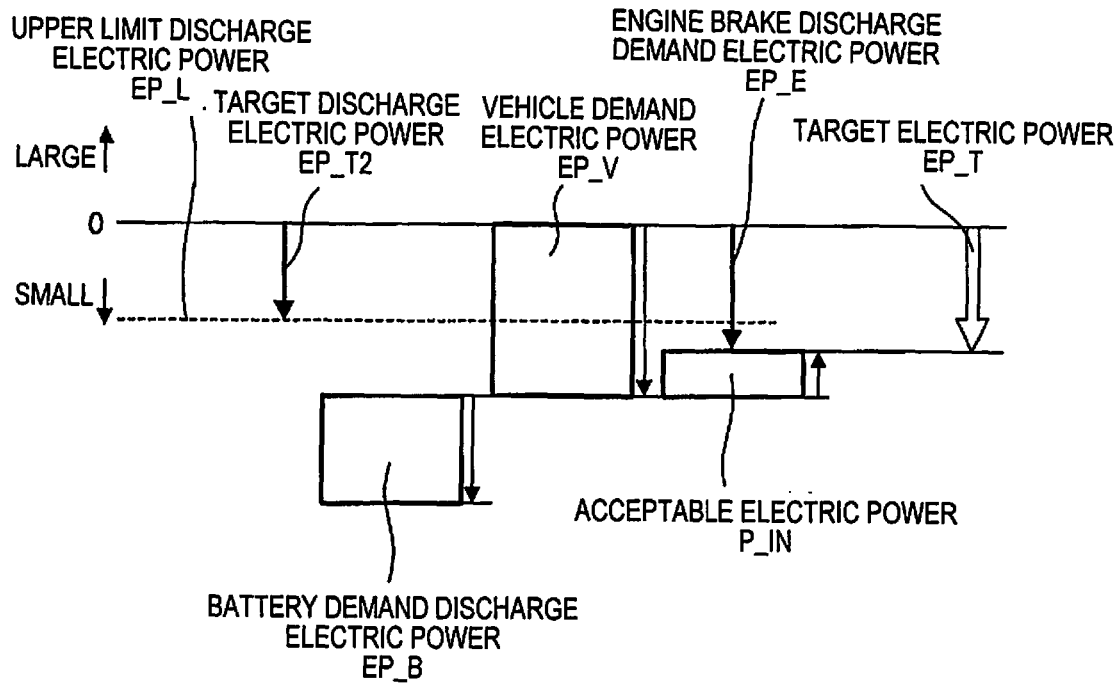
FIG. 13 is a first illustration of processing performed by the target electric power arbitration unit.

FIG. 13 is a first illustration of processing performed by the target arbitration unit 49. FIG. 13 shows a case in which the driver request is for regeneration and the engine braking discharge demand electric power EP_E is present. The same applies to FIGS. 14 and 15, described further below.

The upper limit discharge electric power EP_L is greater than the sum of the vehicle demand electric power EP_V and the battery demand discharge electric power EP_B, i.e., the target discharge electric power EP_T1 prior to processing performed by the target discharge electric power limitation unit 46. Therefore, in this case, the target discharge electric power EP_T2 is the upper limit discharge electric power EP_L.

The target discharge electric power EP_T2 is greater than the engine braking discharge demand electric power EP_E. However, the engine braking discharge demand electric power EP_E has higher priority than the target discharge electric power EP_T2. Therefore, in this case, the engine braking discharge demand electric power EP_E is the target electric power EP_T.

In other words, when there is an engine braking discharge demand electric power EP_E, electric power equal to the engine braking discharge demand electric power EP_E is discharged even if the target discharge electric power EP_T2 becomes the upper limit discharge electric power EP_L and is greater than the engine braking discharge demand electric power EP_E. In other words, the engine braking discharge demand electric power EP_E is given priority.

Figure 14:
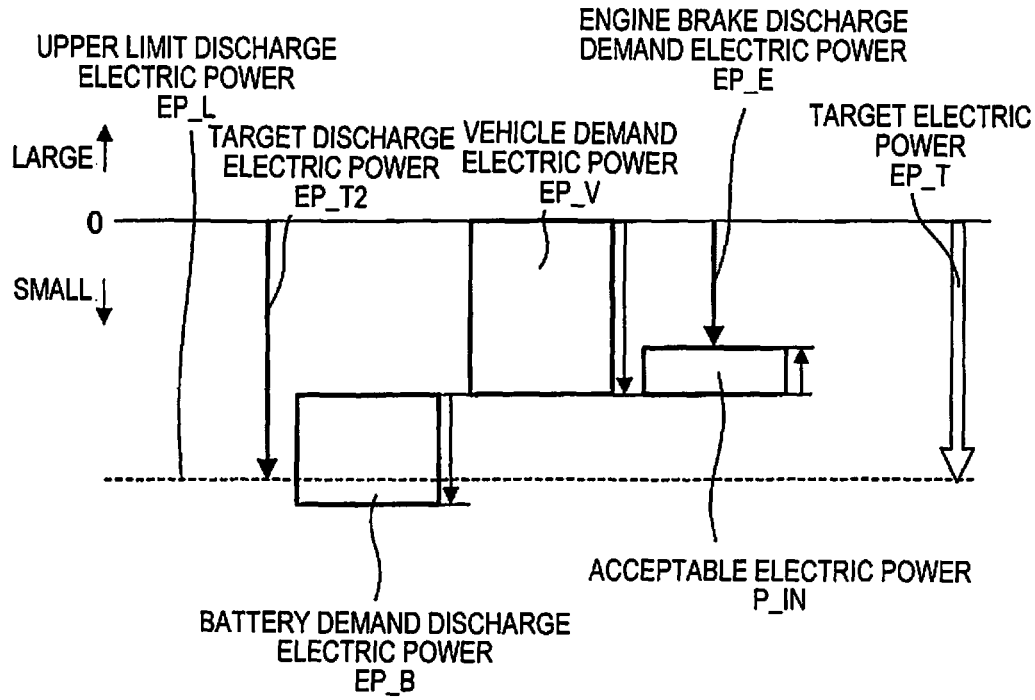
FIG. 14 is a second illustration of processing performed by the target electric power arbitration unit.

FIG. 14 is a second illustration of processing performed by the target arbitration unit 49. Even in this example, the target discharge electric power EP_T2 is the upper limit discharge electric power EP_L. However, the target discharge electric power EP_T2 is smaller than the engine braking discharge demand electric power EP_E. Therefore, in this case, the target discharge electric power EP_T2 is the target electric power EP_T. In this case, discharging that meets the vehicle demand and the engine braking discharge demand can be performed by the pre-motoring.

Figure 15:
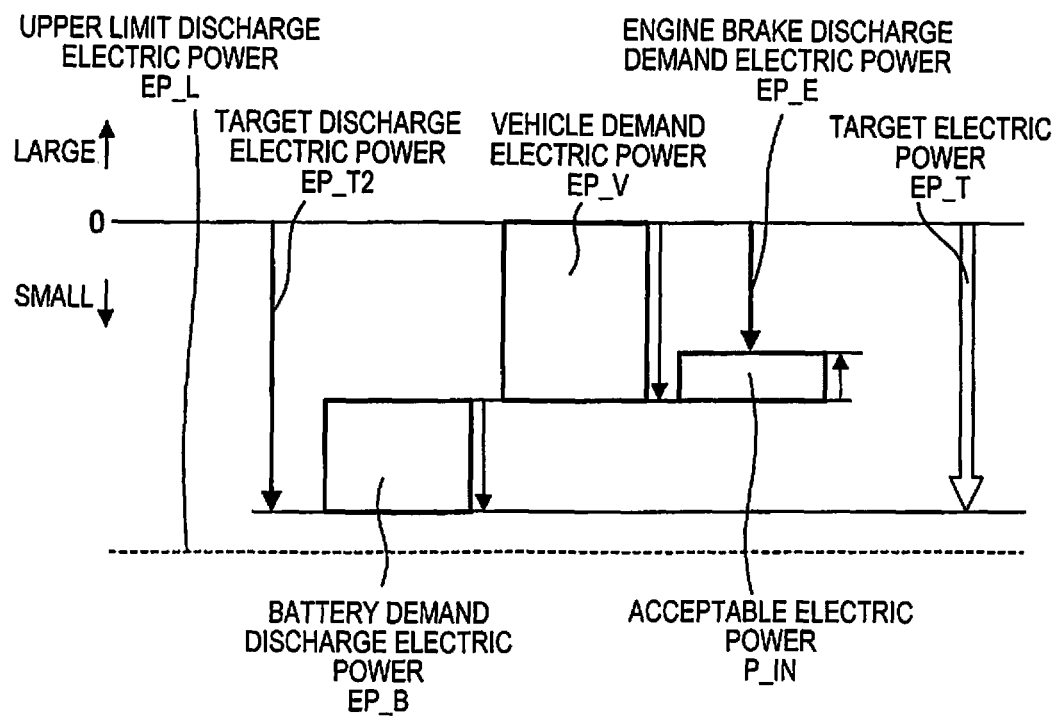
FIG. 15 is a third illustration of processing performed by the target electric power arbitration unit.

FIG. 15 is a third illustration of processing performed by the target arbitration unit 49. In this example, the target discharge electric power EP_T2 is greater than the upper limit discharge electric power EP_L and smaller than the engine braking discharge demand electric power EP_E. In this case, the target discharge electric power EP_T2 is the target electric power EP_T, and discharging which meets vehicle demand, battery demand, and engine braking discharge demand can be performed by the pre-motoring.

Figure 16:
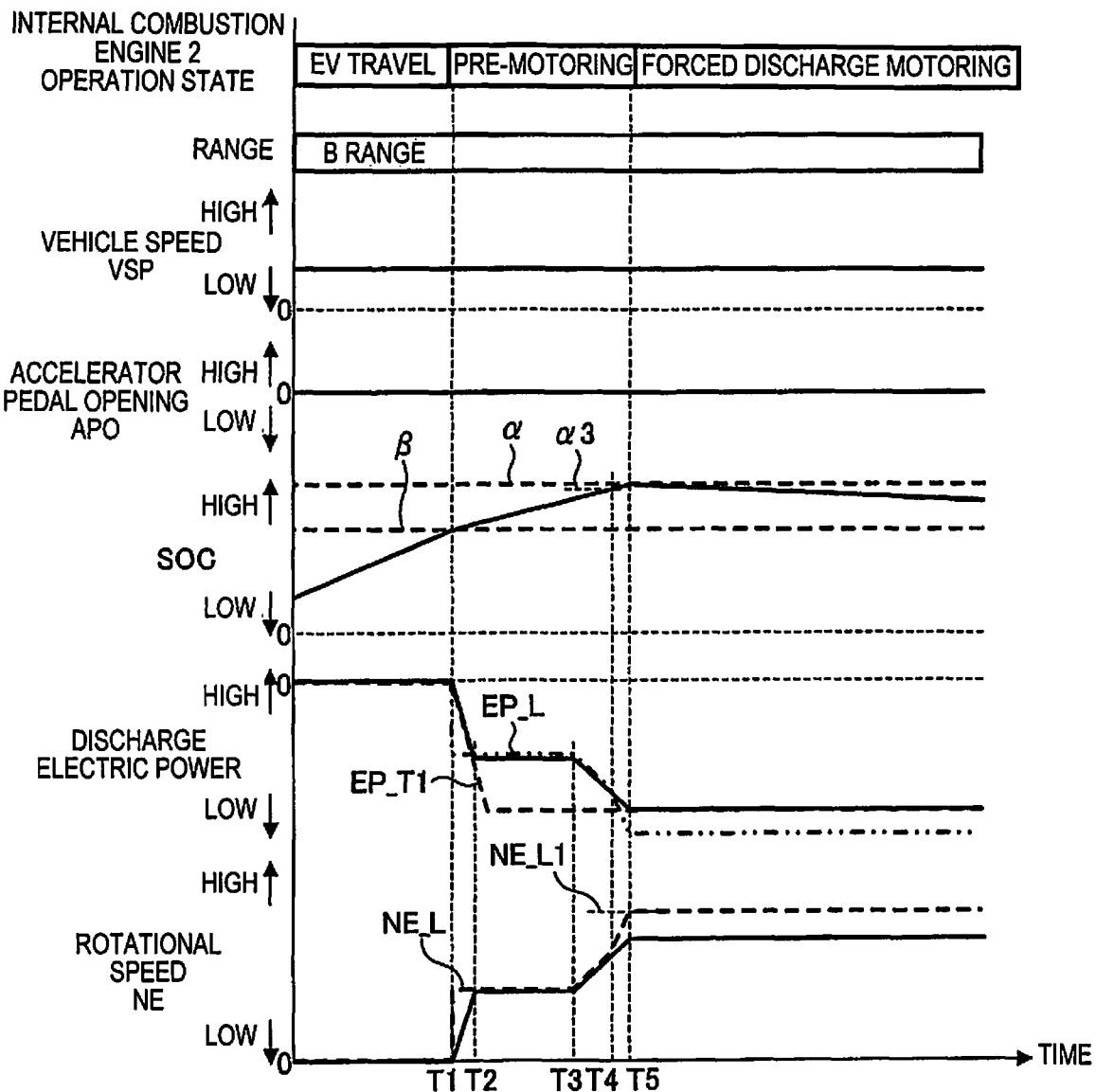
FIG. 16 is an illustration of an example of a timing chart related to an embodiment.

Next, an example of a timing chart according to the present embodiment is described with reference to FIG. 16. EV travel is performed in the B range before time T1. The vehicle 1 is traveling downhill, the vehicle speed VSP is constant, and the accelerator pedal opening APO is zero. The drive motor 4 carries out regeneration, and the SOC gradually rises. Since the vehicle 1 is engaged in EV travel, the electric power generating motor 3 is neither generating nor discharging power. Therefore, the discharge electric power of the electric power generating motor 3 and the rotational speed NE of the internal combustion engine 2 are zero.

At time T1, the SOC reaches the prescribed value β. As a result, pre-motoring is started and the absolute value of the discharge electric power begins to increase. Before time T2, the rotational speed NE has not reached the upper limit rotational speed NE_L for pre-motoring, and because the target electric power EP_T is configured by the target discharge electric power EP_T1, the discharge electric power changes in accordance with the target discharge electric power EP_T1.

At time T2, the rotational speed NE reaches the upper limit rotational speed NE_L, and the target electric power EP_T is configured by the upper limit discharge electric power EP_L. As a result, the discharge electric power is limited to the upper limit discharge electric power EP_L.

At time T3, the upper limit rotational speed NE_L begins to increase as the SOC rises. As a result, starting at time T3, the rotational speed NE rises following the upper limit of rotational speed NE_L, and the discharge electric power increases as an absolute value following the upper limit discharge electric power EP_L.

At time T5, the SOC reaches the prescribed value α, and forced discharge motoring is started. At time T5, the discharge electric power reaches the target discharge electric power EP_T1. Therefore, the rotational speed NE and the discharge electric power become constant, and the SOC becomes constant. As a result, the battery 5 is prevented from becoming fully charged.

Forced discharge motoring at this time is performed in accordance with the negative vehicle demand electric power EP_V as well as the battery demand discharge electric power EP_B. Therefore, regeneration by the drive motor 4 is also ensured, and a drop in deceleration due to limiting regeneration is also avoided.

Starting at time T5, an upper limit rotational speed NE_L1 for forced discharge motoring is applied to the rotational speed NE. The upper limit rotational speed NE_L1 is preset separately from the upper limit rotational speed NE_L for pre-motoring.

If there is a step difference in the rotational speed between the upper limit rotational speed NE_L for pre-motoring and the upper limit rotational speed NE_L1 for forced discharge motoring, then the rotational speed NE changes abruptly during the transition from pre-motoring to forced discharge motoring, which can cause driver discomfort.

Therefore, the upper limit rotational speed NE_L for pre-motoring is set such that there are no step differences in the rotational speed relative to upper limit rotational speed NE_L1 for forced discharge motoring. With these settings, the degree of increase in the upper limit rotational speed NE_L for pre-motoring corresponding to the increase in the SOC can be set higher in cases in which the SOC is at or above the prescribed value α3 than in cases in which the state of charge is below the prescribed value α3.

The prescribed value α3 is an SOC which is smaller than the prescribed value α and is set in advance. In this example, the SOC at time T4 is the prescribed value α3. With this setting, the upper limit rotational speed NE_L for pre-motoring may increase linearly or curvilinearly as the SOC increases.

These settings are reflected in advance in the map data shown in FIG. 7, described above. Therefore, the interval D1 is greater than the interval D2 at a prescribed vehicle speed VSP2 in the map data shown in FIG. 7.

The prescribed vehicle speed VSP2 is the vehicle speed VSP which is below a prescribed vehicle speed VSP1 and is the vehicle speed VSP in the intermediate speed region. The interval D1 is the interval between the upper limit rotational speed NE_L for the prescribed vehicle speed VSP2 when the SOC is at or above the prescribed value α and at the prescribed value α2. The interval D2 is the interval between the upper limit rotational speed NE_L and the prescribed vehicle speed VSP2 when the SOC is at or below the prescribed value α1 and at the prescribed value α2.

In other words, with these settings, the interval between the equal SOC lines of the upper limit rotational speed NE_L for pre-motoring is greater in cases in which the SOC is at or above the prescribed value α3 than in cases in which the state of charge is less than the prescribed value α3. In this case, the difference in the SOC between these equal SOC lines is the same, and the vehicle speed VSP is the prescribed vehicle speed VSP2, which is lower than the prescribed vehicle speed VSP1. In the map data shown in FIG. 7, the upper limit rotational speed NE_L is set to the upper limit rotational speed NE_L1 for forced discharge motoring when at or above the prescribed value α.

The main effects of the present embodiment will now be described.

The control method for a series hybrid vehicle according to the present embodiment is used in the vehicle 1 which has a D range and a B range and in which the battery 5 is charged with electric power from the electric power generating motor 3 that generates electric power by being driven by the drive power of the internal combustion engine 2 and with electric power regenerated by the drive motor 4, the drive wheels 6 are driven by the drive motor 4 using the electrical power from the battery 5, and deceleration produced by regeneration by the drive motor 4 is set to be greater in the B range than in the D range. The control method for a series hybrid vehicle includes starting motoring of the internal combustion engine 2 at an SOC of the battery 5 which is lower in the B range than in the D range, i.e., pre-motoring.

By using this method, the battery 5 can be discharged at an SOC which is lower in the B range than in the D range by carrying out pre-motoring. Therefore, the battery 5 can be prevented from becoming fully charged in the B range in which deceleration is greater. Therefore, charging of the battery 5 by limiting regeneration can be minimized, and situations can be prevented in which reduced deceleration due to limiting regeneration in the B range causes the driver to experience discomfort.

In the present embodiment, in the B range, pre-motoring is started at the prescribed value β which is higher than the prescribed value γ, which is the upper limit SOC at which electric power generation is maintained in charge mode in the battery 5.

By using this method, there is no need to start driving internal combustion engine 2 using the electric power generating motor 3 immediately after stopping operation of the internal combustion engine 2 which had been generating electric power, and thus the risk of causing large fluctuations in the rotational speed NE can be avoided. Therefore, large fluctuations in the rotational speed NE caused by transitioning from electric power generation to pre-motoring in the B range, which would cause driver discomfort, can be prevented.

In the present embodiment, the prescribed value γ is the same in the D range and the B range.

By using this method, pre-motoring is not initiated even when switching to the B range during electric power generation in the D range. Furthermore, electric power generation is not started even when switching to the D range during pre-motoring in the B range. Therefore, large fluctuations in the rotational speed NE caused by switching between the B range and the D range, which would cause driver discomfort, can be prevented.

In the present embodiment, the higher the SOC of the battery 5, the higher the rotational speed NE for pre-motoring.

By using this method, the battery demand discharge electric power EP_B, the absolute value of which increases as the SOC increases, can be appropriately discharged by pre-motoring.

By using the present embodiment, the rotational speed NE for pre-motoring can be made to increase with the magnitude of deceleration.

By using this method, the negative vehicle demand electric power EP_V, i.e., the regeneration demand electric power, the absolute value of which increases with the magnitude of deceleration, can be suitably discharged during pre-motoring.

An embodiment of the present invention was described above, but the embodiment is merely example of implementation of the present invention and does not limit the essence of the technical scope of the present invention to the specific configuration of the present embodiment.

In the foregoing embodiment, a case was described in which the series hybrid vehicle control method and control unit are realized by the electric power generating motor controller 32 and the integrated controller 34. However, it is also possible to realize the series hybrid vehicle control method and control unit using a single controller, for example.

The invention claimed is:

1. A series hybrid vehicle control method for a series hybrid vehicle including a first forward range and a second forward range, a battery charged with electric power from an electric power generation motor that generates electric power by being driven by a drive power of an internal combustion engine and charged with electric power regenerated by a drive motor, and a drive wheel driven by the drive motor using electric power from the battery during EV travel, and deceleration generated by regenerative braking of the drive motor is greater in the second forward range than in the first forward range, the vehicle being configured to allow a driver to select between a charge mode that requires charging the battery by electric power generation by the electric power generation motor, and an EV mode that requires the EV travel without electric power generation by the electric power generation motor, the series hybrid vehicle control method comprising:
in the charge mode,
charging the battery with the electric power generated by the electric power generation motor where the SOC of the battery is at or below a first predetermined value, irrespective of a range, and terminating the electric power generation by the electric power generation motor where the SOC of the battery exceeds the first predetermined value, and in the EV mode,
starting motoring of the internal combustion engine in the second forward range by the electric power generation motor using electric power from the battery where the SOC of the battery exceeds a second predetermined value that is greater than the first predetermined value, and not performing the motoring in the first forward range even where the SOC of the battery exceeds the second predetermined value.

2. The series hybrid vehicle control method according to claim 1, wherein
the motoring of the internal combustion engine in the second forward range is started by the electric power generation motor using electric power from the battery where the SOC of the battery exceeds the second predetermined value even in the charge mode.

3. The series hybrid vehicle control method according to claim 1, wherein
the motoring is performed in either the first forward range or the second forward range where the SOC of the battery exceeds a third predetermined value that is greater than the second predetermined value, irrespective of the charge mode or EV mode, and the rotational speed of the motoring is made to increase as the SOC of the battery increases.

4. The series hybrid vehicle control method according to claim 1, wherein
the motoring is performed in either the first forward range or the second forward range, where the SOC of the battery exceeds a third predetermined value that is greater than the second predetermined value, irrespective of the charge mode or EV mode, and a rotational speed of the motoring is increased as the SOC of the battery increases.

5. The series hybrid vehicle control method according to claim 1, wherein
the motoring includes a pre-motoring and a forced discharge motoring,
the pre-motoring is motoring performed in the second forward range in the charge mode and the EV mode during a time the SOC of the battery reaches a third predetermined value that is greater than the second predetermined value, from the second predetermined value, and the pre-motoring is set based on a battery demand discharge electric power that is demanded in accordance with the SOC of the battery, and
the forced discharge motoring is motoring performed when the SOC of the battery is at or above the third predetermined value in either the first forward range or the second forward range, irrespective of the charge mode or the EV mode, and the forced discharge motoring is set based on the battery demand discharge electric power and the vehicle demand electric power for discharging.

6. A series hybrid vehicle control device for a series hybrid vehicle including a first forward range and a second forward range, a battery charged with electric power from an electric power generation motor that generates electric power by being driven by the drive power from an internal combustion engine and charged with electric power regenerated by a drive motor, the electric power from the battery being used to drive a drive wheel that is driven by the drive motor using electric power from the battery during EV travel, and deceleration generated by regenerative braking of the drive motor is greater in the second forward range than in the first forward range, the vehicle being configured to allow a driver to select between a charge mode that requires charging the battery by electric power generation by the electric power generation motor, and an EV mode that requires EV travel without electric power generation by the electric power generation motor, the series hybrid vehicle control device comprising:

a controller configured to in the charge mode, charge the battery with the electric power generated by the electric power generation motor where the SOC of the battery is at or below a first predetermined value, irrespective of a range, and terminate the electric power generation by the electric power generation motor where the SOC of the battery exceeds the first predetermined value, and in the EV mode, start motoring of the internal combustion engine in the second forward range by the electric power generation motor using electric power from the battery where the SOC of the battery exceeds a second predetermined value that is greater than the first predetermined value, and not perform the motoring in the first forward range even where the SOC of the battery exceeds the second predetermined value.

\* \* \* \* \*